US009882499B2

(12) United States Patent
Sakuno et al.

(10) Patent No.: US 9,882,499 B2
(45) Date of Patent: Jan. 30, 2018

(54) SWITCHING POWER SUPPLY CIRCUIT WITH REDUCED NOISE AND POTENTIAL STABILIZATION OF STABLE POTENTIAL NODES (71) Applicant: Sharp Kabushiki Kaisha, Osaka (JP)

(72) Inventors: Keiichi Sakuno, Osaka (JP); Hiroshi Itoh, Osaka (JP); Toshiyuki Oka, Osaka (JP)

(73) Assignee: Sharp Corporation, Csaka (JP)

( * ) Notice: Subject to any disclaimer, the term of this patent is extended or adjusted under 35 U.S.C. 154(b) by 0 days.

(21) Appl. No.: 15/116,265

(22) PCT Filed: Jan. 8, 2015

(86) PCT No.: PCT/JP2015/050357
§ 371 (c)(1),
(2) Date: Aug. 3, 2016

(87) PCT Pub. No.: WO2015/141243
PCT Pub. Date: Sep. 24, 2015

(65) Prior Publication Data
US 2017/0012548 A1 Jan. 12, 2017

(30) Foreign Application Priority Data

Mar. 19, 2014 (JP) ................................. 2014-056728

(51) Int. Cl.
H02M 3/335 (2006.01)
H02M 1/44 (2007.01)
(Continued)

(52) U.S. Cl.
CPC ......... H02M 3/33592 (2013.01); H02M 1/44 (2013.01); H02M 3/33523 (2013.01);
(Continued)

(58) Field of Classification Search
CPC ......... H02M 3/33507; H02M 3/33523; H02M 3/33561; H02M 3/33563; H02M 3/33569;
(Continued)

(56) References Cited

U.S. PATENT DOCUMENTS 3,717,808 A * 2/1973 Horna .................... H01F 27/362
323/305
5,939,844 A * 8/1999 Shiomi ................... H04N 3/185
315/370
(Continued)

FOREIGN PATENT DOCUMENTS

JP   S61273173 A   12/1986
JP   2002-15881 A   1/2002
(Continued)

OTHER PUBLICATIONS

International Search Report of PCT/JP2015/050357 dated Mar. 17, 2015.

Primary Examiner — Yemane Mehari
(74) Attorney, Agent, or Firm — Birch, Stewart, Kolasch & Birch, LLP (57) ABSTRACT In a switching power supply circuit of the invention, a low-voltage node capacitor is connected between a primary-side low-voltage stable potential node and a secondary-side low-voltage stable potential node, and a high-voltage node capacitor is connected between a primary-side high-voltage stable potential node and an anode of a rectifier element. Thereby, it is possible to provide the switching power supply circuit which achieves, with a simple configuration, both of noise reduction and potential stabilization of stable potential nodes.

4 Claims, 7 Drawing Sheets (51) Int. Cl.
  *H02M 7/12*  (2006.01)
  *H02M 1/12*  (2006.01)
  *H02M 1/42*  (2007.01)
  *H02M 7/217*  (2006.01)
(52) U.S. Cl.
  CPC ............ *H02M 7/125* (2013.01); *H02M 1/126* (2013.01); *H02M 1/4258* (2013.01); *H02M 7/2176* (2013.01); *Y02B 70/126* (2013.01)
(58) Field of Classification Search
  CPC ..... H02M 3/33592; H02M 2001/0032; H02M 2007/4851; Y02B 70/1441
  USPC ........................................... 363/21.01–21.18
  See application file for complete search history.

(56) References Cited

U.S. PATENT DOCUMENTS

| | | | |
|---|---|---|---|
| 6,292,069 B1* | 9/2001 | Michaels | ............... G08C 19/46 |
| | | | 280/735 |
| 2015/0023070 A1* | 1/2015 | Nate | ................. H02M 3/33507 |
| | | | 363/21.17 |

FOREIGN PATENT DOCUMENTS

| | | | |
|---|---|---|---|
| JP | 2004173383 A | 6/2004 |
| JP | 2009-71158 A | 4/2009 |
| JP | 2014-130831 A | 7/2014 |

\* cited by examiner

FIG. 1

1A: SWITCHING POWER SUPPLY CIRCUIT
2 : GROUND
3 : NOISE MEASURING DEVICE
4 : HIGH-VOLTAGE NODE CAPACITOR
5 : LOW-VOLTAGE NODE CAPACITOR
10 : TRANSFORMER PRIMARY-SIDE SECTION
11a, 11b: AC INPUT TERMINAL
12 : NOISE FILTER
13 : RECTIFIER CIRCUIT
14, 32: VOLTAGE SMOOTHING CAPACITOR
14a: UPPER TERMINAL
14b: LOWER TERMINAL
15 : SWITCHING FET
15a: SOURCE TERMINAL
20 : TRANSFORMER
21 : PRIMARY-SIDE WINDING
21a: PRIMARY-SIDE HIGH-VOLTAGE TERMINAL
21b: PRIMARY-SIDE LOW-VOLTAGE TERMINAL
22 : SECONDARY-SIDE WINDING
22a: SECONDARY-SIDE HIGH-VOLTAGE TERMINAL
22b: SECONDARY-SIDE LOW-VOLTAGE TERMINAL
30 : TRANSFORMER SECONDARY-SIDE SECTION
31a: DIODE (31: RECTIFIER ELEMENT)
33a, 33b: DC OUTPUT TERMINAL
C : STRAY CAPACITANCE
Ct : PARASITIC CAPACITANCE
HN1: PRIMARY-SIDE HIGH-VOLTAGE STABLE POTENTIAL NODE
HN2: SECONDARY-SIDE HIGH-VOLTAGE STABLE POTENTIAL NODE
LN1: PRIMARY-SIDE LOW-VOLTAGE STABLE POTENTIAL NODE
LN2: SECONDARY-SIDE LOW-VOLTAGE STABLE POTENTIAL NODE

1B: SWITCHING POWER SUPPLY CIRCUIT
2 : GROUND
3 : NOISE MEASURING DEVICE
4 : HIGH-VOLTAGE NODE CAPACITOR
5 : LOW-VOLTAGE NODE CAPACITOR
10 : TRANSFORMER PRIMARY-SIDE SECTION
11a, 11b: AC INPUT TERMINAL
12 : NOISE FILTER
13 : RECTIFIER CIRCUIT
14, 32: VOLTAGE SMOOTHING CAPACITOR
14a: UPPER TERMINAL
14b: LOWER TERMINAL
15 : SWITCHING FET
15a: SOURCE TERMINAL
20 : TRANSFORMER
21 : PRIMARY-SIDE WINDING
21a: PRIMARY-SIDE HIGH-VOLTAGE TERMINAL
21b: PRIMARY-SIDE LOW-VOLTAGE TERMINAL
22 : SECONDARY-SIDE WINDING
22a: SECONDARY-SIDE HIGH-VOLTAGE TERMINAL
22b: SECONDARY-SIDE LOW-VOLTAGE TERMINAL
30 : TRANSFORMER SECONDARY-SIDE SECTION
31b: MOSFET (31: RECTIFIER ELEMENT)
33a, 33b: DC OUTPUT TERMINAL
C : STRAY CAPACITANCE
Ct : PARASITIC CAPACITANCE
HN1: PRIMARY-SIDE HIGH-VOLTAGE STABLE POTENTIAL NODE
HN2: SECONDARY-SIDE HIGH-VOLTAGE STABLE POTENTIAL NODE
LN1: PRIMARY-SIDE LOW-VOLTAGE STABLE POTENTIAL NODE
LN2: SECONDARY-SIDE LOW-VOLTAGE STABLE POTENTIAL NODE

FIG. 5

1C: SWITCHING POWER SUPPLY CIRCUIT
2 : GROUND
3 : NOISE MEASURING DEVICE
4a: FIRST HIGH-VOLTAGE NODE CAPACITOR
4b: SECOND HIGH-VOLTAGE NODE CAPACITOR
5a: FIRST LOW-VOLTAGE NODE CAPACITOR
5b: SECOND LOW-VOLTAGE NODE CAPACITOR
10 : TRANSFORMER PRIMARY-SIDE SECTION
11a, 11b: AC INPUT TERMINAL
12 : NOISE FILTER
13 : RECTIFIER CIRCUIT
14, 32: VOLTAGE SMOOTHING CAPACITOR
14a: UPPER TERMINAL
14b: LOWER TERMINAL
15 : SWITCHING FET
15a: SOURCE TERMINAL
20 : TRANSFORMER
21 : PRIMARY-SIDE WINDING
21a: PRIMARY-SIDE HIGH-VOLTAGE TERMINAL
21b: PRIMARY-SIDE LOW-VOLTAGE TERMINAL
22 : SECONDARY-SIDE WINDING
22a: SECONDARY-SIDE HIGH-VOLTAGE TERMINAL
22b: SECONDARY-SIDE LOW-VOLTAGE TERMINAL
30 : TRANSFORMER SECONDARY-SIDE SECTION
31a: DIODE (31: RECTIFIER ELEMENT)
33a, 33b: DC OUTPUT TERMINAL
C : STRAY CAPACITANCE
Ct : PARASITIC CAPACITANCE
HN1: PRIMARY-SIDE HIGH-VOLTAGE STABLE POTENTIAL NODE
HN2: SECONDARY-SIDE HIGH-VOLTAGE STABLE POTENTIAL NODE
LN1: PRIMARY-SIDE LOW-VOLTAGE STABLE POTENTIAL NODE
LN2: SECONDARY-SIDE LOW-VOLTAGE STABLE POTENTIAL NODE

FIG. 6

1D: SWITCHING POWER SUPPLY CIRCUIT
2 : GROUND
3 : NOISE MEASURING DEVICE
4 : HIGH-VOLTAGE NODE CAPACITOR
5 : LOW-VOLTAGE NODE CAPACITOR
6 : FIRST HIGH-FREQUENCY NOISE ATTENUATION MEANS
7 : SECOND HIGH-FREQUENCY NOISE ATTENUATION MEANS
10 : TRANSFORMER PRIMARY-SIDE SECTION
11a, 11b: AC INPUT TERMINAL
12 : NOISE FILTER
13 : RECTIFIER CIRCUIT
14, 32: VOLTAGE SMOOTHING CAPACITOR
14a: UPPER TERMINAL
14b: LOWER TERMINAL
15 : SWITCHING FET
15a: SOURCE TERMINAL
20 : TRANSFORMER
21 : PRIMARY-SIDE WINDING
21a: PRIMARY-SIDE HIGH-VOLTAGE TERMINAL
21b: PRIMARY-SIDE LOW-VOLTAGE TERMINAL
22 : SECONDARY-SIDE WINDING
22a: SECONDARY-SIDE HIGH-VOLTAGE TERMINAL
22b: SECONDARY-SIDE LOW-VOLTAGE TERMINAL
30 : TRANSFORMER SECONDARY-SIDE SECTION
31a: DIODE (31: RECTIFIER ELEMENT)
33a, 33b: DC OUTPUT TERMINAL
C : STRAY CAPACITANCE
Ct : PARASITIC CAPACITANCE
HN1: PRIMARY-SIDE HIGH-VOLTAGE STABLE POTENTIAL NODE
HN2: SECONDARY-SIDE HIGH-VOLTAGE STABLE POTENTIAL NODE
LN1: PRIMARY-SIDE LOW-VOLTAGE STABLE POTENTIAL NODE
LN2: SECONDARY-SIDE LOW-VOLTAGE STABLE POTENTIAL NODE

FIG. 7

1E: SWITCHING POWER SUPPLY CIRCUIT
2 : GROUND
3 : NOISE MEASURING DEVICE
4a: FIRST HIGH-VOLTAGE NODE CAPACITOR
4b: SECOND HIGH-VOLTAGE NODE CAPACITOR
5a: FIRST LOW-VOLTAGE NODE CAPACITOR
5b: SECOND LOW-VOLTAGE NODE CAPACITOR
6 : FIRST HIGH-FREQUENCY NOISE ATTENUATION MEANS
7 : SECOND HIGH-FREQUENCY NOISE ATTENUATION MEANS
10 : TRANSFORMER PRIMARY-SIDE SECTION
11a, 11b: AC INPUT TERMINAL
12 : NOISE FILTER
13 : RECTIFIER CIRCUIT
14, 32: VOLTAGE SMOOTHING CAPACITOR
14a: UPPER TERMINAL
14b: LOWER TERMINAL
15 : SWITCHING FET
15a: SOURCE TERMINAL
20 : TRANSFORMER
21 : PRIMARY-SIDE WINDING
21a: PRIMARY-SIDE HIGH-VOLTAGE TERMINAL
21b: PRIMARY-SIDE LOW-VOLTAGE TERMINAL
22 : SECONDARY-SIDE WINDING
22a: SECONDARY-SIDE HIGH-VOLTAGE TERMINAL
22b: SECONDARY-SIDE LOW-VOLTAGE TERMINAL
30 : TRANSFORMER SECONDARY-SIDE SECTION
31a: DIODE (31: RECTIFIER ELEMENT)
33a, 33b: DC OUTPUT TERMINAL
C : STRAY CAPACITANCE
Ct : PARASITIC CAPACITANCE
HN1: PRIMARY-SIDE HIGH-VOLTAGE STABLE POTENTIAL NODE
HN2: SECONDARY-SIDE HIGH-VOLTAGE STABLE POTENTIAL NODE
LN1: PRIMARY-SIDE LOW-VOLTAGE STABLE POTENTIAL NODE
LN2: SECONDARY-SIDE LOW-VOLTAGE STABLE POTENTIAL NODE

SWITCHING POWER SUPPLY CIRCUIT WITH REDUCED NOISE AND POTENTIAL STABILIZATION OF STABLE POTENTIAL NODES

TECHNICAL FIELD

The present invention relates to a switching power supply circuit including a transformer in which a primary side and a secondary side are insulated and separated and power is transmitted to the secondary side, a switching transistor which performs switching of power in the primary side of the transformer, and a rectifier element which rectifies power in the secondary side of the transformer, and, specifically, relates to a circuit technique by which noise generated in the switching power supply circuit is reduced.

BACKGROUND ART

In order to cause electronic equipment to work, a stable direct current voltage is required for operating an IC or a transistor. Examples of systems of generating the stable direct current voltage, that is, a constant voltage include an AC (Alternating Current)-DC (Direct Current) system in which an input side (primary side) is a commercial alternating current power supply and a DC-DC system in which the input side (primary side) is a direct current power supply such as a battery.

Examples of a power supply apparatus which generates such a constant voltage include a switching power supply, which is a power supply apparatus adopting a switching system, and a power supply apparatus adopting a series system (dropper system, or linear system). In recent years, the mainstream is the switching power supply which has an advantage of being highly efficient and light.

The switching power supply has a great advantage to be able to use a coil, a transformer, or the like, which is small-sized, by high-frequency switching, but needs to perform switching of a high voltage at a high speed, so that switching noise is easily generated.

Particularly, in a flyback circuit system in which input and output are insulated by a transformer, when a primary-side switching element is brought into a turn-off state, switching is performed with a voltage obtained by superposing a flyback voltage on an input power supply voltage. Accordingly, noise resulting from high-voltage switching is easily generated.

Examples of a mode of generated noise include normal mode noise which is transmitted between power supply lines and common mode noise which is transmitted between each power supply line and the ground. The common mode noise is generated due to a stray capacitance which exists between a power supply line and the ground, asymmetry of transmission characteristics of power supply lines, or the like. It is generally difficult to quantitatively specify or estimate a generation point or generation level of noise, and, in some cases, it is difficult to reduce noise sufficiently only with a countermeasure by a filter which is arranged in an input portion of a switching power supply.

As a conventional technique by which common mode noise in a switching power supply circuit is reduced, a switching power supply circuit disclosed in PTL 1 and a noise reduction method for a switching circuit disclosed in PTL 2 are known, for example.

Figure 8:
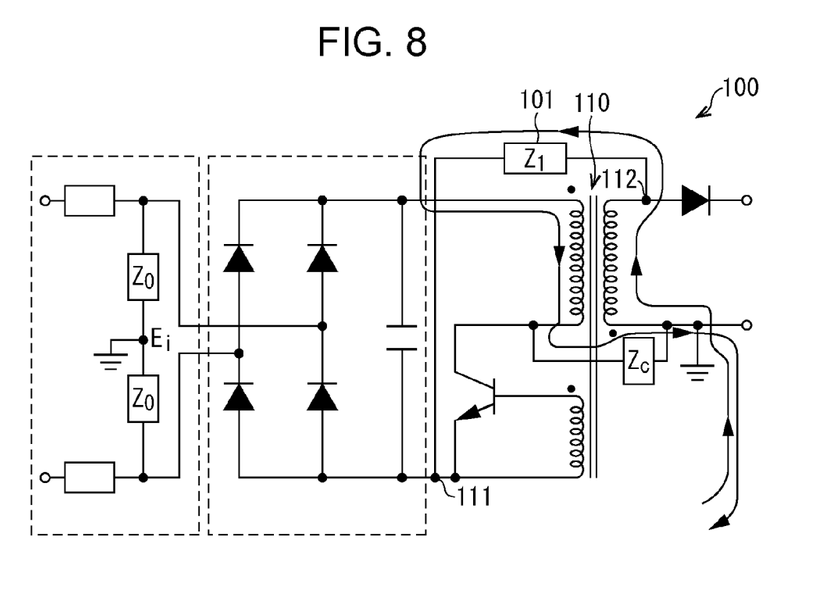
FIG. 8 is a circuit diagram illustrating a configuration of a conventional switching power supply circuit.

In a switching power supply circuit 100 disclosed in PTL 1, as illustrated in FIG. 8, a capacitance 101 is added between a primary-side voltage node 111 and a secondary-side node 112 of a transformer 110. Thereby, a common mode noise current whose phase is opposite to that of a common mode noise current which passes through a parasitic distributed capacitance of the transformer 110 is transmitted through the capacitance 101, resulting in that common mode noise currents at a ground point are offset.

Figure 9:
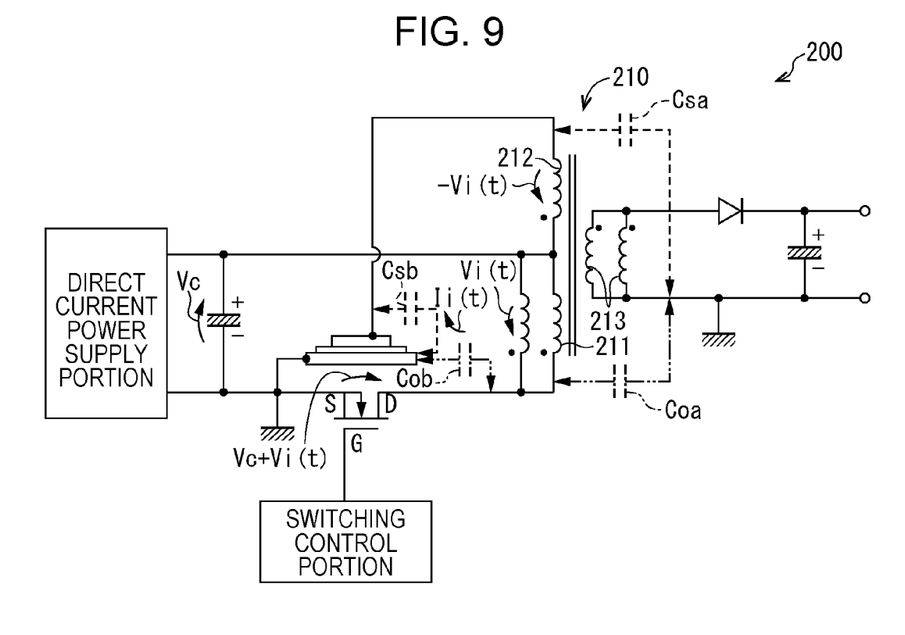
FIG. 9 is a circuit diagram illustrating a configuration of another conventional switching power supply circuit.

Moreover, in the noise reduction method for a switching circuit 200 disclosed in PTL 2, as illustrated in FIG. 9, an auxiliary winding 212 which generates an electromotive voltage whose phase is opposite to that of a main switching winding 211 in a primary side of a transformer 210 is added to the primary side of the transformer 210.

Thereby, a stray capacitance Coa which is generated between a secondary-side winding 213 and the switching winding 211 in the primary side and which causes generation of noise is offset by an added stray capacitance Csa which is generated between the secondary-side winding 213 and the auxiliary winding 212 in the primary side and which has an opposite phase. As a result of this, common mode noise currents at a ground point are offset.

CITATION LIST

Patent Literature

PTL 1: Japanese Unexamined Patent Application Publication No. 61-273173 (published on Dec. 3, 1986)

PTL 2: Japanese Unexamined Patent Application Publication No. 2004-173383 (published on Sep. 24, 1999)

SUMMARY OF INVENTION

Technical Problem

However, the conventional techniques of reducing common mode noise have following problems.

First, in the switching power supply circuit 100 disclosed in PTL 1, the primary-side voltage node 111 in a primary side and the secondary-side node (anode of a secondary-side rectifier diode) 112 in a secondary side of the transformer 110 are coupled by the added capacitance 101.

In addition, in the noise reduction method for the switching circuit 200 disclosed in PTL 2, a variable potential node (one end of the auxiliary winding 212) in the primary side and a low-voltage stable potential node (secondary-side ground) in a secondary side are coupled by the added stray capacitance Csa which is added.

As a result of this, in the both cases, there is a problem that, since the stable potential node is coupled with the variable potential node whose potential swings with a high voltage due to the added capacitance at a time of switching, a potential of the stable potential node is disturbed, so that a power supply operation easily becomes unstable.

Moreover, in the noise reduction method for the switching circuit 200 disclosed in PTL 2, since the auxiliary winding 212 is required, there is a problem that complication and an increase in a size of a structure of the transformer are caused.

The invention is made in view of the aforementioned conventional problems, and an object thereof is to provide a switching power supply circuit which achieves, with a simple configuration, both of noise reduction and potential stabilization of stable potential nodes.

Solution to Problem

In order to solve the aforementioned problems, a switching power supply circuit of one aspect of the invention is a switching power supply circuit, including: a transformer in which a primary side and a secondary side are insulated and separated and power is transmitted to the secondary side; a switching field effect transistor which performs switching of power in the primary side of the transformer; and a rectifier element which rectifies power in the secondary side of the transformer, in which one end of a primary-side terminal of the transformer is connected to a primary-side high-voltage stable potential node, the other end of the primary-side terminal of the transformer is connected to a drain of the switching field effect transistor, a source of the switching field effect transistor is connected to a primary-side low-voltage stable potential node, one end of a secondary-side terminal of the transformer is connected to an anode of the rectifier element, a cathode of the rectifier element is connected to a secondary-side high-voltage stable potential node, and the other end of the secondary-side terminal of the transformer is connected to a secondary-side low-voltage stable potential node, a low-voltage node capacitor is connected between the primary-side low-voltage stable potential node and the secondary-side low-voltage stable potential node, and a high-voltage node capacitor is connected between the primary-side high-voltage stable potential node and the anode of the rectifier element.

Advantageous Effects of Invention

According to one aspect of the invention, an effect of providing a switching power supply circuit which achieves, with a simple configuration, both of noise reduction and potential stabilization of stable potential nodes is obtained.

DESCRIPTION OF EMBODIMENTS

Embodiment 1

One embodiment of the invention is described based on FIG. 1 to FIG. 3 as follows.

(Configuration of Switching Power Supply Circuit)

Description will be given for a configuration of a switching power supply circuit of the present embodiment based on FIG. 1. FIG. 1 is a circuit diagram illustrating the configuration of the switching power supply circuit of the present embodiment.

A switching power supply circuit 1A of the present embodiment is provided with a transformer 20 in which a transformer primary-side section 10 and a transformer secondary-side section 30 are insulated and separated and power is transmitted to the transformer secondary-side section 30.

The transformer 20 is composed of a primary side and a secondary side which are insulated and separated, and configured by a flyback transformer in which power is transmitted from the transformer primary-side section 10 to the transformer secondary-side section 30 by switching of a switching FET (Field Effect Transistor) 15 described below. Note that, the flyback transformer is a transformer which is used for a flyback converter. The flyback converter is a switching power supply circuit which, by using the transformer in which the primary side and the secondary side are insulated and separated, stores power in the primary side of the transformer 20, in which the primary side and the secondary side are insulated and separated, during a period in which the switching FET 15 is in an on state. Then, when the switching FET 15 is brought into an off state, outputs the power stored in the primary side to the secondary side by using a counter electromotive force of the transformer 20.

A primary-side winding 21 is provided in the primary side of the transformer 20, and a secondary-side winding 22 is provided in the secondary side of the transformer 20. A parasitic capacitance Ct exists between the primary-side winding 21 and the secondary-side winding 22.

The transformer primary-side section 10 includes AC (Alternating Current) input terminals 11a and 11b, a noise filter 12, a rectifier circuit 13, a voltage smoothing capacitor for a high-voltage node 14 which is used after rectification, and the switching FET 15.

For example, a commercial alternating current power supply is connected to the AC (Alternating Current) input terminals 11a and 11b.

The noise filter 12 is installed so that high-frequency noise generated in the switching power supply circuit 1A falls within a standard value. In the present embodiment, the noise filter 12 is composed of a capacitor and a coil, for example. However, there is no limitation thereto.

The rectifier circuit 13 is a circuit which has a rectification action of causing a current to flow in only one direction, and is formed of, for example, a diode which converts an alternating current into a direct current.

The voltage smoothing capacitor for a high-voltage node 14 is inserted between output terminals of the rectifier circuit 13 in order to reduce a pulsation component between load terminals when a load is connected to the rectifier circuit 13. In this case, the larger a capacitance of the voltage smoothing capacitor for a high-voltage node 14 is or the smaller a resistance load current is, the slower the discharge from the voltage smoothing capacitor for a high-voltage node 14 becomes and the smaller the pulsation component becomes.

In the present embodiment, it is set here that a node connected to an upper terminal 14a of the voltage smoothing capacitor for a high-voltage node 14 is referred to as a primary-side high-voltage stable potential node HN1, and a node connected to a lower terminal 14b of the voltage smoothing capacitor for a high-voltage node 14 is referred to as a primary-side low-voltage stable potential node LN1. It is preferable that potentials of the primary-side high-voltage stable potential node HN1 and the primary-side low-voltage stable potential node LN1 do not fluctuate. However, due to an influence of a change in a voltage, which is caused by a switching operation of the switching FET 15, potential fluctuation may be practically caused to a certain extent.

The switching FET 15 is on/off-controlled in order to alternately perform, from an output of the voltage smoothing capacitor for a high-voltage node 14, storing power in the primary side of the transformer 20 and discharging the power to the secondary side. The switching FET 15 is configured to be able to perform switching of a high voltage at a high speed.

A source of the switching FET 15 is connected to the primary-side low-voltage stable potential node LN1, and a drain of the switching FET 15 is connected to a primary-side low-voltage terminal 21b of the transformer 20.

Meanwhile, the transformer secondary-side section 30 is provided with a rectifier element 31, a voltage smoothing capacitor 32, and DC output terminals 33a and 33b.

In the present embodiment, the rectifier element 31 is formed of, for example, a diode 31a, and the diode 31a rectifies a current generated in the transformer secondary-side section 30. An anode of the diode 31a is connected to a secondary-side high-voltage terminal 22a of the transformer 20, and a cathode of the diode 31a is connected to a secondary-side high-voltage stable potential node HN2.

The voltage smoothing capacitor 32 is to smooth a pulsating current after secondary-side rectification.

The DC output terminals 33a and 33b are terminals from which an output of a direct current (DC) is taken out.

(Suppression of Noise Generated in Switching Power Supply Circuit)

In the switching power supply circuit 1A having the aforementioned configuration, there is a stray capacitance C between the switching power supply circuit 1A and the ground 2. Common mode noise which flows through a path between the switching power supply circuit 1A and the ground 2 via the stray capacitance C is able to be detected by measurement with a noise measuring device 3.

The noise measuring device 3 is used as an LISN (Line Impedance Stabilizing Network) which is inserted between the switching power supply circuit 1A and equipment in a case where measurement of conducted emission is performed. Note that, the LISN (Line Impedance Stabilizing Network) is a term of a standard of the FCC (Federal Communications Commission) of the United States.

Here, the primary-side low-voltage terminal 21b of the transformer 20 is a hot noise node whose potential greatly fluctuates by switching of the switching FET 15. The secondary-side high-voltage terminal 22a of the transformer 20 is a hot noise node whose potential greatly fluctuates by an on/off operation of the diode 31a.

The diode 31a is brought into an on/off state in synchronism with the switching FET 15. Accordingly, there is a correlation between noise generated in the primary-side low-voltage terminal 21b and noise generated in the secondary-side high-voltage terminal 22a. Specifically, a potential of the primary-side low-voltage terminal 21b is raised when the switching FET 15 is turned off, and, in synchronism therewith, a potential of the secondary-side high-voltage terminal 22a is also raised. With the correlation, when it is possible to compose noise generated in the primary-side low-voltage terminal 21b and noise generated in the secondary-side high-voltage terminal 22a with an appropriate phase and amplitude, it becomes possible to offset the noise of the both terminals.

Then, in the present embodiment, a low-voltage node capacitor 5 is connected between the primary-side low-voltage stable potential node LN1 and a secondary-side low-voltage stable potential node LN2. In addition, a high-voltage node capacitor 4 is connected between the primary-side high-voltage stable potential node HN1 and the anode of the diode 31a.

Thereby, the primary-side low-voltage stable potential node LN1 and the secondary-side low-voltage stable potential node LN2 are electrically coupled with each other by the low-voltage node capacitor 5. Therefore, it is possible to realize stabilization of potentials of the primary-side low-voltage stable potential node LN1 and the secondary-side low-voltage stable potential node LN2.

Further, in this state, a capacitance value of the high-voltage node capacitor 4 is set to be an appropriate value. Thereby, a common mode noise current which flows via the high-voltage node capacitor 4 has a phase opposite to that of a common mode noise current which flows via the low-voltage node capacitor 5 and the parasitic capacitance Ct of the transformer 20. As a result thereof, a common mode noise current which flows via the stray capacitance C between the switching power supply circuit 1A and the ground 2 is suppressed. That is, common mode noise to be observed by the noise measuring device 3 is reduced.

Specifically, when the switching FET 15 is turned off, the potential of the primary-side low-voltage terminal 21b is raised. At this time, since a potential of a secondary-side connection end of the parasitic capacitance Ct is a stable potential, a high-frequency common mode noise current Ia flows in a direction of a dashed-line arrow in FIG. 1.

On the other hand, when the switching FET 15 is turned off, the diode 31a is turned on. Thus, the potential of the secondary-side high-voltage terminal 22a is also raised. At this time, since a potential of a primary-side high-voltage terminal 21a of the high-voltage node capacitor 4 is a stable potential, a high-frequency common mode noise current Ib flows in a direction of a solid-line arrow in FIG. 1.

The directions of the common mode noise current Ia of the dashed-line arrow and the common mode noise current Ib of the solid-line arrow have mutually reversed polarities. Thus, when the capacitance value of the high-voltage node capacitor 4 is set to be the appropriate value, the common mode noise is mutually offset, and the common mode noise to be measured by the noise measuring device 3 is reduced.

Note that, when the switching FET 15 is turned on, each of the directions of the flows of the common mode noise currents Ia and Ib is merely reversed. As a result of this, an offset relation of the common mode noise is maintained, and the common mode noise is reduced.

Here, the common mode noise current Ia indicated with the dashed-line arrow flows via the parasitic capacitance Ct and the low-voltage node capacitor 5, but both ends of the low-voltage node capacitor 5 are high-frequency stable potential nodes. Accordingly, it is considered that most of the common mode noise current Ia flows via the parasitic capacitance Ct.

As described above, in the switching power supply circuit 1A of the present embodiment, it is possible to achieve both of the reduction in the common mode noise and the potential stabilization of the stable potential nodes by the low-voltage node capacitor 5 and the high-voltage node capacitor 4.

An effect thereof will be described based on FIG. 2 and FIG. 3. FIG. 2 is a view indicating one example of actual measurement values of spectrum of peak detection noise in the switching power supply circuit 1A, which are measured by the noise measuring device 3. Here, a measurement frequency range is 150 kHz to 30 MHz. Note that, FIG. 2 indicates a measurement result in a state where the high-voltage node capacitor 4 is not added. FIG. 3 is a view indicating quasi-peak detection noise value Qp (Quasi-Peak) when the high-voltage node capacitor 4 illustrated in FIG. 1 is added to the switching power supply circuit 1A from the state of FIG. 2, in which measurement data was acquired, and then the capacitance value is changed. The quasi-peak detection noise value Qp is a noise indicator which is specified by a standard of a noise terminal voltage, and indicates a measurement value by the LISN. The measured frequencies are in a switching frequency band with 170 kHz as the center thereof.

In the switching power supply circuit 1A of the present embodiment, the low-voltage node capacitor 5 is connected, and a capacitance value thereof is set to be, for example, 470 pF. In this case, a measurement frequency range is 150 kHz to 30 MHz.

Figure 1:
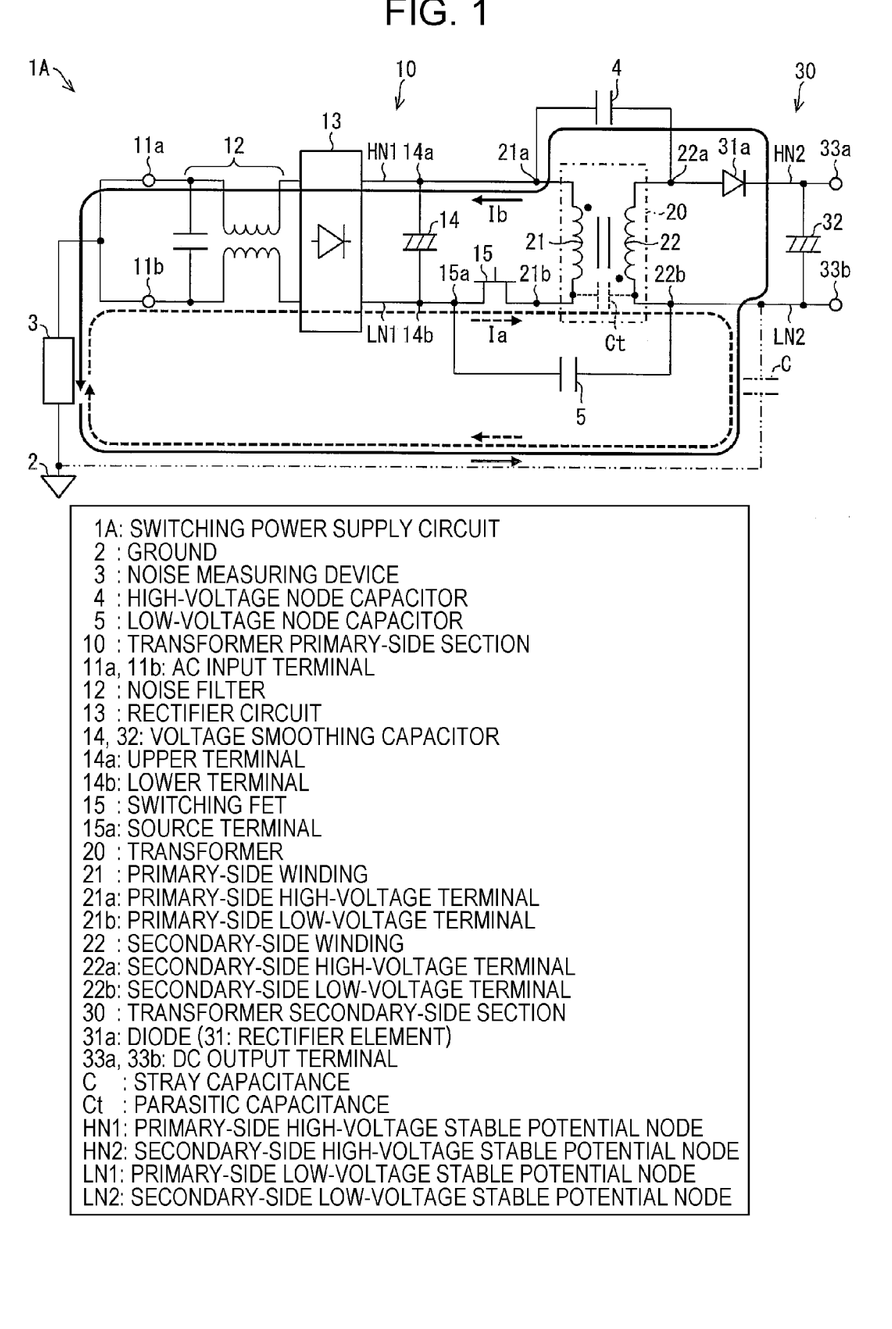
FIG. 1 is a circuit diagram illustrating a configuration of a switching power supply circuit in Embodiment 1 of the invention.
Figure 2:
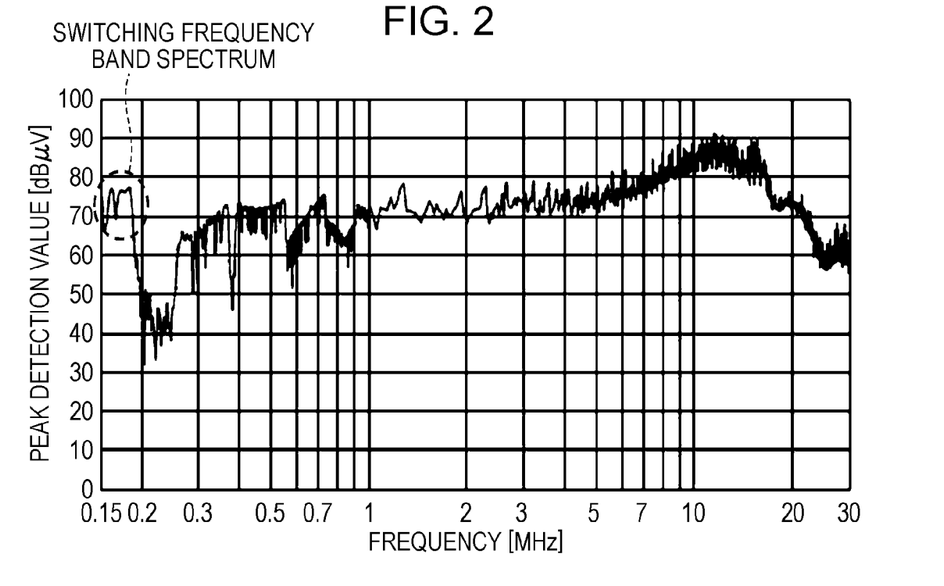
FIG. 2 is a view indicating one example of actual measurement values of spectrum of peak detection noise in the switching power supply circuit.

In FIG. 1, a portion surrounded with a dashed line is noise spectrum with switching frequencies, and the center of the switching frequencies is about 170 kHz. High-frequency noise which is equal to or more than 10 MHz is able to be reduced by a small-sized filter. However, noise in the switching frequency band has a low frequency, so that, when trying to eliminate the noise by the noise filter 12, a size of the filter is increased.

Here, the noise filter 12 is generally a coupling inductor type, and an inductance value thereof is several mH to several tens mH.

Figure 3:
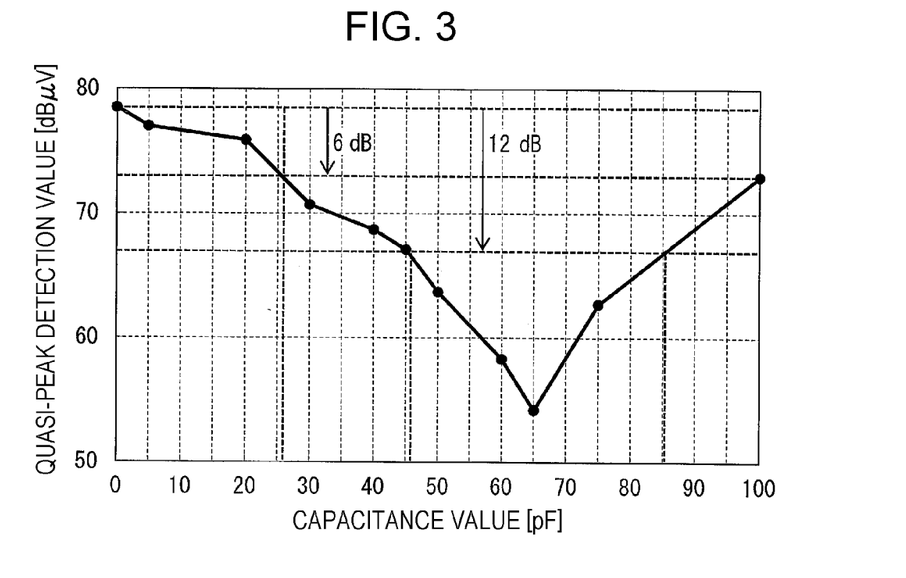
FIG. 3 is a view indicating actual measurement values of dependency of a capacitance value of a capacitor for offsetting common mode noise of quasi-peak detection noise in the switching power supply circuit.

Next, as indicated in FIG. 3, in the measured switching frequency band with 170 kHz as the center, the quasi-peak detection noise value Qp is reduced by adding the high-voltage node capacitor 4, and becomes minimal at 65 pF. The quasi-peak detection noise value Qp has a minimal value with respect to the capacitance value of the high-voltage node capacitor 4, which is considered to clearly describe an offset effect of the common mode noise by adding the high-voltage node capacitor 4.

It is shown that, in a state where the capacitance value of the high-voltage node capacitor 4 is 65 pF at which the quasi-peak detection noise value Qp becomes minimal, reduction in the quasi-peak detection noise value Qp by 20 dB or more is realized compared with a state of 0 pF, in which the high-voltage node capacitor 4 is not added. When the capacitance value of the high-voltage node capacitor 4 is several tens pF, a small-sized surface mounting capacitor of a chip type is able to be used. Therefore, even when the high-voltage node capacitor 4 is added, an influence on a size of the switching power supply circuit 1A is small.

On the other hand, by adding the high-voltage node capacitor 4, it is possible to reduce a noise attenuation amount required for the noise filter 12 illustrated in FIG. 1, thus making it possible to miniaturize the noise filter 12.

Particularly, the effect is exerted more with respect to the switching power supply circuit 1A which operates with the switching frequency within the frequency band specified by the standard of the noise terminal voltage.

In recent years, switching devices which uses a wide band gap semiconductor such as gallium nitride (GaN) or SiC (silicon carbide) and allows high speed response have been put to practical use. Therefore, it is considered that miniaturization of a capacitor, an inductor, and a transformer, which constitute a power supply circuit, progresses according to heightening of a switching frequency. In the switching power supply circuit 1A of the present embodiment, a further effect is exerted in a case where progress is made in such heightening of a switching frequency.

In a case where, in order to miniaturize the noise filter 12, an inductance value thereof is reduced by half, as illustrated in FIG. 3, the attenuation amount of the noise filter 12 is reduced by 6 dB. It is shown that, in a case where the reduction amount is complemented by adding the high-voltage node capacitor 4, as illustrated in FIG. 3, the capacitance value of the high-voltage node capacitor 4 is preferably 25 pF to 100 pF. In the present embodiment, the capacitance value of the low-voltage node capacitor 5 is 470 pF, for example. Thus, it is preferable that a ratio of the capacitance value of the low-voltage node capacitor 5 with respect to that of the high-voltage node capacitor 4 is 5 times to 18 times.

In a case where, in order to further miniaturize the noise filter 12, the inductance value thereof is reduced to one quarter, the attenuation value of the noise filter 12 is reduced by 12 B. It is shown that, in a case where the reduction amount is complemented by adding the high-voltage node capacitor 4, as illustrated in FIG. 3, the capacitance value of the high-voltage node capacitor 4 is preferably 45 pF to 85 pF. In the present embodiment, the capacitance value of the low-voltage node capacitor 5 is 470 pF, for example. Thus, it is preferable that the ratio of the capacitance value of the low-voltage node capacitor 5 with respect to that of the high-voltage node capacitor 4 is 5.5 times to 10 times.

As above, the switching power supply circuit 1A of the present embodiment includes the transformer 20 in which the primary side and the secondary side are insulated and separated and power is transmitted to the secondary side, the switching FET 15 which performs switching of power in the primary side of the transformer 20, and the diode 31a serving as the rectifier element 31, which rectifies power in the secondary side of the transformer 20. The primary-side high-voltage terminal 21a of the transformer 20 is connected to the primary-side high-voltage stable potential node HN1, the primary-side low-voltage terminal 21b of the transformer 20 is connected to the drain of the switching FET 15, the source of the switching FET 15 is connected to the primary-side low-voltage stable potential node LN1, the secondary-side high-voltage terminal 22a of the transformer 20 is connected to the anode of the diode 31a serving as the rectifier element 31, the cathode of the diode 31a serving as the rectifier element 31 is connected to the secondary-side high-voltage stable potential node HN2, and the secondary-side low-voltage terminal 22b of the transformer 20 is connected to the secondary-side low-voltage stable potential node LN2.

In such a switching power supply circuit 1A, conventionally, the primary-side low-voltage stable potential node LN1 and the secondary-side high-voltage stable potential node HN2, or the primary-side high-voltage stable potential node HN1 and the secondary-side low-voltage stable potential node LN2 are in a coupled state. Therefore, there is a problem that a potential of each stable potential node is disturbed at a time of switching, so that a power supply operation easily becomes unstable.

Then, in the present embodiment, the low-voltage node capacitor 5 is connected between the primary-side low-voltage stable potential node LN1 and the secondary-side low-voltage stable potential node LN2. The primary-side low-voltage stable potential node LN1 and the secondary-side low-voltage stable potential node LN2 are thus electrically coupled by the low-voltage node capacitor 5, so that potential fluctuation of the stable potential nodes is suppressed.

In the present embodiment, the high-voltage node capacitor 4 is connected between the primary-side high-voltage stable potential node HN1 and the anode of the diode 31a serving as the rectifier element 31. Therefore, the common mode noise current Ib which flows via the high-voltage node capacitor 4 has a phase opposite to that of the common mode noise current Ia which flows via the low-voltage node capacitor 5 and the parasitic capacitance Ct of the transformer 20. As a result thereof, a common mode noise current which flows via the stray capacitance C between the secondary-side high-voltage stable potential node HN2 and the ground 2 is suppressed. That is, the common mode noise to be observed by the noise measuring device 3 is reduced.

In the present embodiment, since the low-voltage node capacitor 5 and the high-voltage node capacitor 4 are only added, the configuration is simple.

Therefore, it is possible to provide the switching power supply circuit 1A which achieves, with the simple configuration, both of noise reduction and potential stabilization of stable potential nodes.

Further, by reducing common mode noise, an effect that miniaturization of the noise filter 12 is enabled is also obtained.

In the switching power supply circuit 1A of the present embodiment, the capacitance value of the high-voltage node capacitor 4 is equal to or more than 25 pF and equal to or less than 100 pF. Thereby, it is possible to obtain an effect of noise reduction by which the inductance value of the noise filter 12 can be reduced by half. As a result thereof, with the simple configuration in which the capacitance value of the high-voltage node capacitor 4 is changed, it is possible to miniaturize the noise filter 12.

Additionally, in the switching power supply circuit 1A of the present embodiment, it is preferable that the capacitance value of the high-voltage node capacitor 4 is equal to or more than 45 pF and equal to or less than 85 pF.

Thereby, it is possible to obtain an effect of noise reduction by which the inductance value of the noise filter 12 can be reduced to one quarter. As a result thereof, with the simple configuration in which the capacitance value of the high-voltage node capacitor 4 is changed, it is possible to further miniaturize the noise filter 12.

In the switching power supply circuit 1A of the present embodiment, the capacitance value of the low-voltage node capacitor 5 is 5 times or more and 18 times or less of the capacitance value of the high-voltage node capacitor 4.

Thereby, it is possible to attain potential stabilization of stable potential nodes and to obtain an effect of noise reduction by which the inductance value of the noise filter 12 can be reduced by half. As a result of this, it is possible to miniaturize the noise filter 12.

Additionally, in the switching power supply circuit 1A of the present embodiment, it is preferable that the capacitance value of the low-voltage node capacitor 5 is 5.5 times or more and 10 times or less of the capacitance value of the high-voltage node capacitor 4.

Thereby, it is possible to attain potential stabilization of stable potential nodes and to obtain an effect of noise reduction by which the inductance value of the noise filter 12 can be reduced to one quarter. As a result of this, it is possible to further miniaturize the noise filter 12.

In the switching power supply circuit 1A of the present embodiment, an operation of a flyback converter is to be performed by the transformer 20, the switching FET 15, and the rectifier element 31.

That is, in the flyback converter, by using the transformer 20 in which the primary side and the secondary side are insulated and separated, power is stored in the primary side of the transformer 20, in which the primary side and the secondary side are insulated and separated, during a period in which the switching FET 15 is in the on state. Then, when the switching FET 15 is brought into the off state, the flyback converter outputs the power stored in the primary side to the secondary side by using a counter electromotive force of the transformer 20.

The flyback converter is suitable to be used for small power to medium power such as about 1 to 200 W. Moreover, in spite of the small number of parts, it is possible to obtain comparatively high conversion efficiency, so that the flyback converter is suitable to be applied to electronic equipment such as a personal computer or industrial equipment.

Thus, it is possible to provide the switching power supply circuit 1A by which miniaturization and weight reduction are attained and which is advantageous also to cost reduction.

Embodiment 2

Another embodiment of the invention is described based on FIG. 4 as follows. Note that, configurations other than what is described in the present embodiment are the same as those of Embodiment 1 above. For convenience of description, the same reference signs are assigned to members having the same functions as those of members of Embodiment 1 above, which are illustrated in the figure, and description thereof will be omitted.

In the switching power supply circuit 1A of Embodiment 1 above, the rectifier element 31 is formed of the diode 31a. However, a switching power supply circuit 1B of the present embodiment is different in that the rectifier element 31 is formed of a MOSFET 31b.

A configuration of the switching power supply circuit 1B of the present embodiment will be described based on FIG. 4. FIG. 4 is a circuit diagram illustrating the configuration of the switching power supply circuit 1B of the present embodiment.

Figure 4:
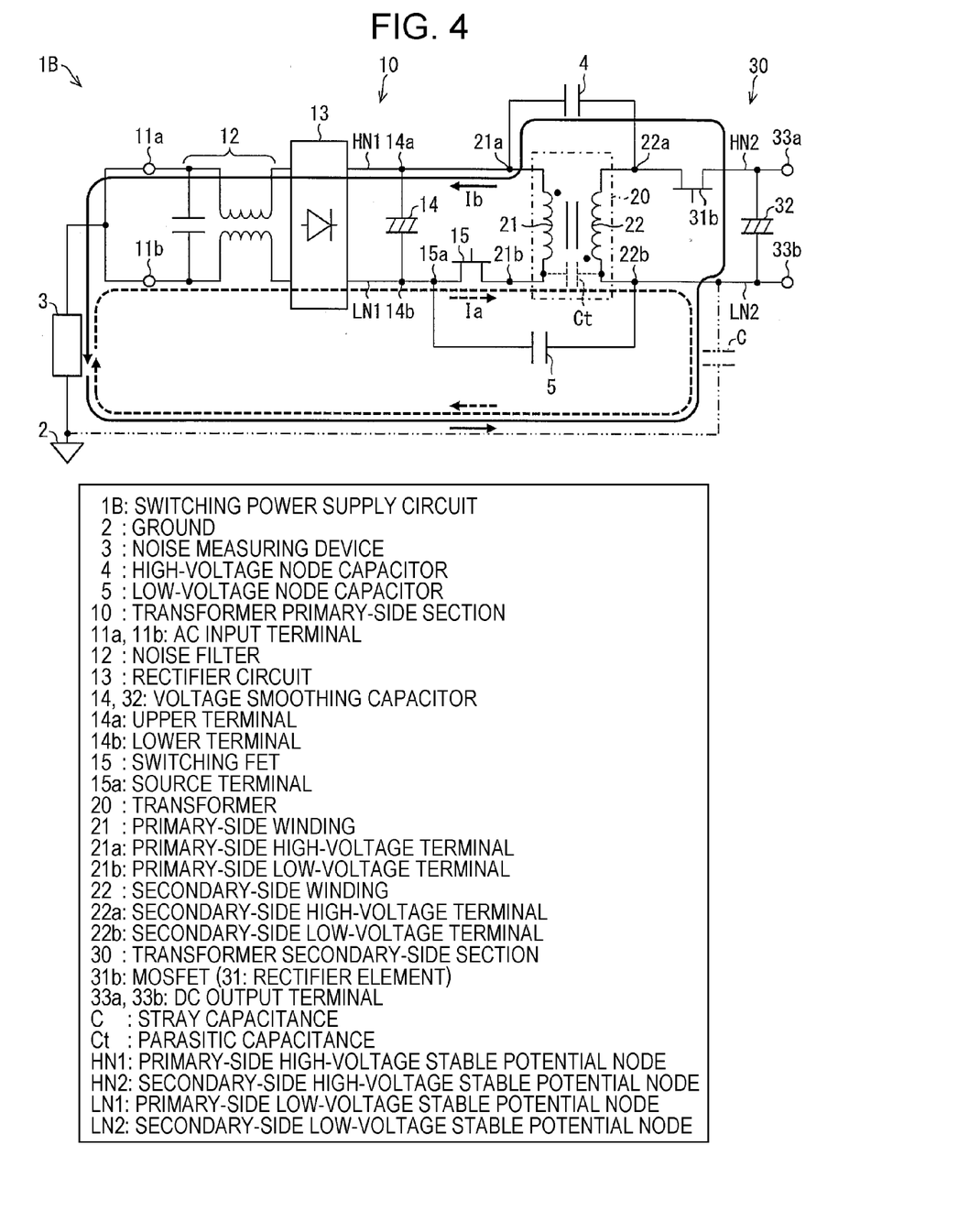
FIG. 4 is a circuit diagram illustrating a configuration of a switching power supply circuit in Embodiment 2 of the invention.

In the switching power supply circuit 1B of the present embodiment, as illustrated in FIG. 4, the rectifier element 31 is formed of a MOSFET (Metal Oxide Semiconductor Field Effect Transistor) 31b serving as a switching metal oxide semiconductor field effect transistor.

In the MOSFET 31b serving as the rectifier element 31, a source and a drain correspond to an anode and a cathode of the rectifier element 31, respectively. A gate of the MOSFET 31b has a configuration of a so-called synchronous rectifier circuit in which switching is performed in synchronism with the switching FET 15 of the transformer primary-side section 10 in an opposite phase. The other configurations are the same as the configurations of the switching power supply circuit 1A of Embodiment.

Even in such a configuration, since the secondary-side high-voltage terminal 22a becomes a hot noise node having a phase opposite to that of the primary-side low-voltage terminal 21b, similarly to the switching power supply circuit 1A of Embodiment 1 above, it is possible to reduce noise to be measured by the noise measuring device 3 by an offset effect of common mode noise.

In addition, in the switching power supply circuit 1B of the present embodiment, a forward voltage of the diode 31a serving as the rectifier element 31 when the diode 31a is turned on in the switching power supply circuit 1A described in Embodiment 1 is able to be substituted in the MOSFET 31b having a low on-voltage. As a result thereof, loss in the switching power supply circuit 1B is also reduced.

In this manner, in the switching power supply circuit 1B of the present embodiment, the rectifier element 31 is formed of the MOSFET 31b whose source serving as the anode is connected to the secondary-side high-voltage terminal 22a of the transformer 20 and whose drain serving as the cathode is connected to the secondary-side high-voltage stable potential node HN2.

Thereby, the MOSFET 31b is used as the rectifier element 31. The MOSFET 31b has an extremely low on-resistance. As a result of this, when the MOSFET 31b is used as the rectifier element 31, it is possible to efficiently rectify a large current with a slight voltage drop, so that loss in the switching power supply circuit 1B is reduced.

Thus, it is possible to provide the switching power supply circuit 1B which has an excellent efficiency compared with a case where the diode 31a made of silicon, which serves as the rectifier element 31, is used.

Embodiment 3

Still another embodiment of the invention is described based on FIG. 5 as follows. Note that, configurations other than what is described in the present embodiment are the same as those of Embodiment 1 above. For convenience of description, the same reference signs are assigned to members having the same functions as those of members of Embodiment 1 above, which are illustrated in the figure, and description thereof will be omitted.

The switching power supply circuit 1A of Embodiment 1 above is provided with one high-voltage node capacitor 4 and one low-voltage node capacitor 5. However, a switching power supply circuit 1C of the present embodiment is different in that a plurality of low-voltage node capacitors 5 and a plurality of high-voltage node capacitors 4 are provided.

A configuration of the switching power supply circuit 1C of the present embodiment will be described based on FIG. 5. FIG. 5 is a circuit diagram illustrating the configuration of the switching power supply circuit 1C of the present embodiment.

Figure 5:
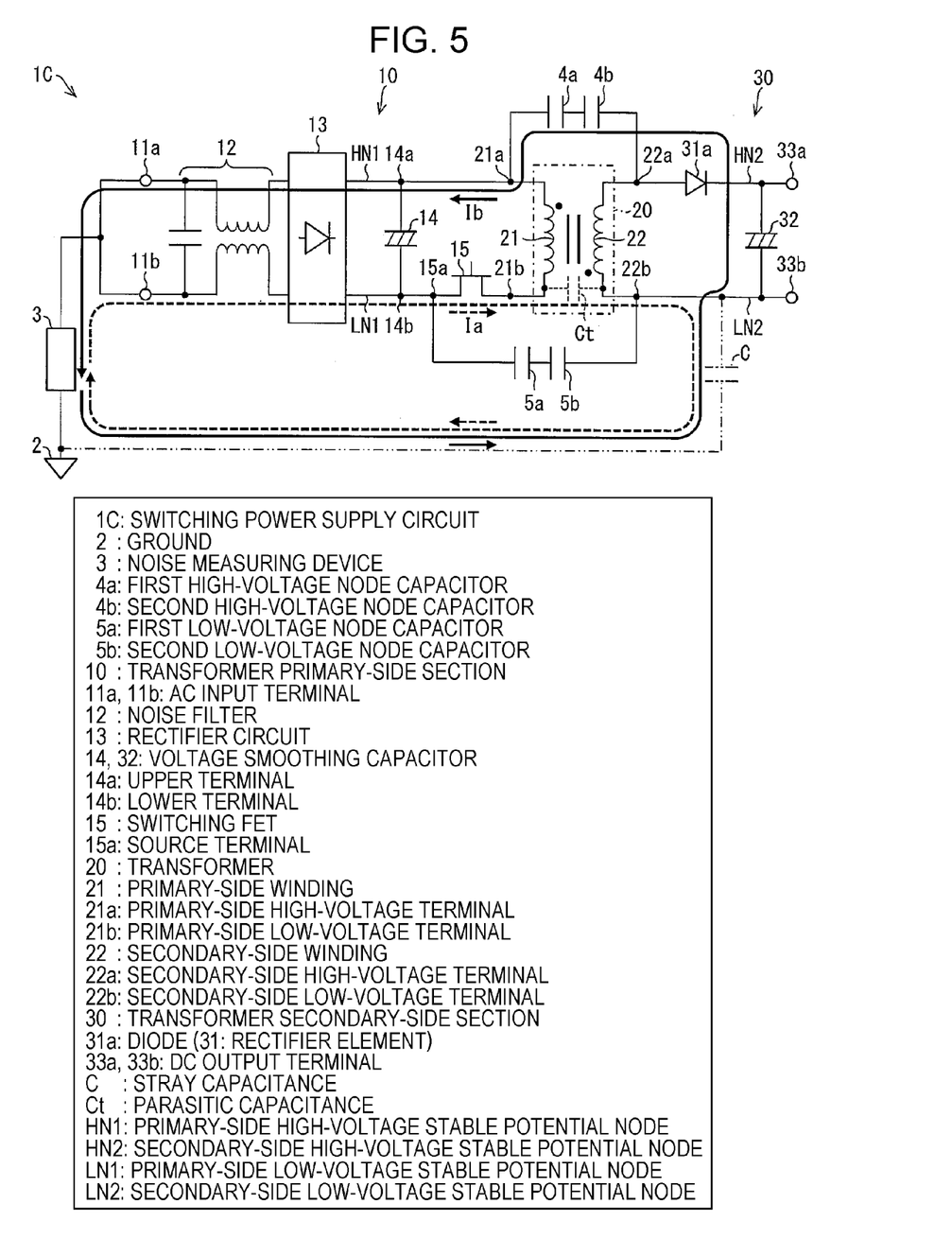
FIG. 5 is a circuit diagram illustrating a configuration of a switching power supply circuit in Embodiment 3 of the invention.

In the switching power supply circuit 1C of the present embodiment, as illustrated in FIG. 5, two, that is, the plurality of low-voltage node capacitors 5 are provided in series, and two, that is, the plurality of high-voltage node capacitors 4 are also provided in series.

That is, in the switching power supply circuit 1A of Embodiment 1, as illustrated in FIG. 1, since each of the high-voltage node capacitor 4 and the low-voltage node capacitor 5 is connected to the transformer primary-side section 10 and the transformer secondary-side section 30, it is necessary to secure a fixed distance between connection points for safety.

Then, in the present embodiment, by connecting capacitors in series and thereby taking advantage of physical sizes of the capacitor themselves, each distance between a primary-side connection point and a secondary-side connection point is made easy to be secured. Specifically, in the high-voltage node capacitor 4, a first high-voltage node capacitor 4a and a second high-voltage node capacitor 4b are connected in series. In the low-voltage node capacitor 5, a first low-voltage node capacitor 5a and a second low-voltage node capacitor 5b are connected in series.

The number of capacitors to be connected in series may be three or more. Moreover, in a case where a safety distance is able to be secured only in the high-voltage node capacitor 4 or the low-voltage node capacitor 5, series connection of capacitors may not be provided.

In this manner, in the switching power supply circuit 1C of the present embodiment, at least one of the high-voltage node capacitor 4 and the low-voltage node capacitor 5 is configured with a series connection circuit of a plurality of capacitors.

Thereby, it is possible to more easily secure a distance between connection points in each of the high-voltage node capacitor 4 and the low-voltage node capacitor 5.

Note that, the invention is not limited to the aforementioned embodiments, and various modifications can be made within the scope of claims of the invention. For example, in the aforementioned embodiment, at least one of the high-voltage node capacitor 4 and the low-voltage node capacitor 5 in the switching power supply circuit 1A described in Embodiment 1 is set to be configured with the plurality of capacitors arranged in series.

However, there is no limitation thereto, and, for example, at least one of the high-voltage node capacitor 4 and the low-voltage node capacitor 5 in the switching power supply circuit 1B described in Embodiment 2 may be set to be configured with the plurality of capacitors arranged in series.

Embodiment 4

Yet another embodiment of the invention is described based on FIG. 6 as follows. Note that, configurations other than what is described in the present embodiment are the same as those of Embodiment 1 above. For convenience of description, the same reference signs are assigned to members having the same functions as those of members of Embodiment 1 above, which are illustrated in the figure, and description thereof will be omitted.

The switching power supply circuit 1A of Embodiment 1 above is provided with one high-voltage node capacitor 4 and one low-voltage node capacitor 5. However, a switching power supply circuit 1D of the present embodiment is different in that, in addition to the high-voltage node capacitor 4 and the low-voltage node capacitor 5, a first high-frequency noise attenuation means 6 and a second high-frequency noise attenuation means 7 are connected in series, respectively.

A configuration of the switching power supply circuit 1D of the present embodiment will be described based on FIG. 6. FIG. 6 is a circuit diagram illustrating the configuration of the switching power supply circuit 1C of the present embodiment.

Figure 6:
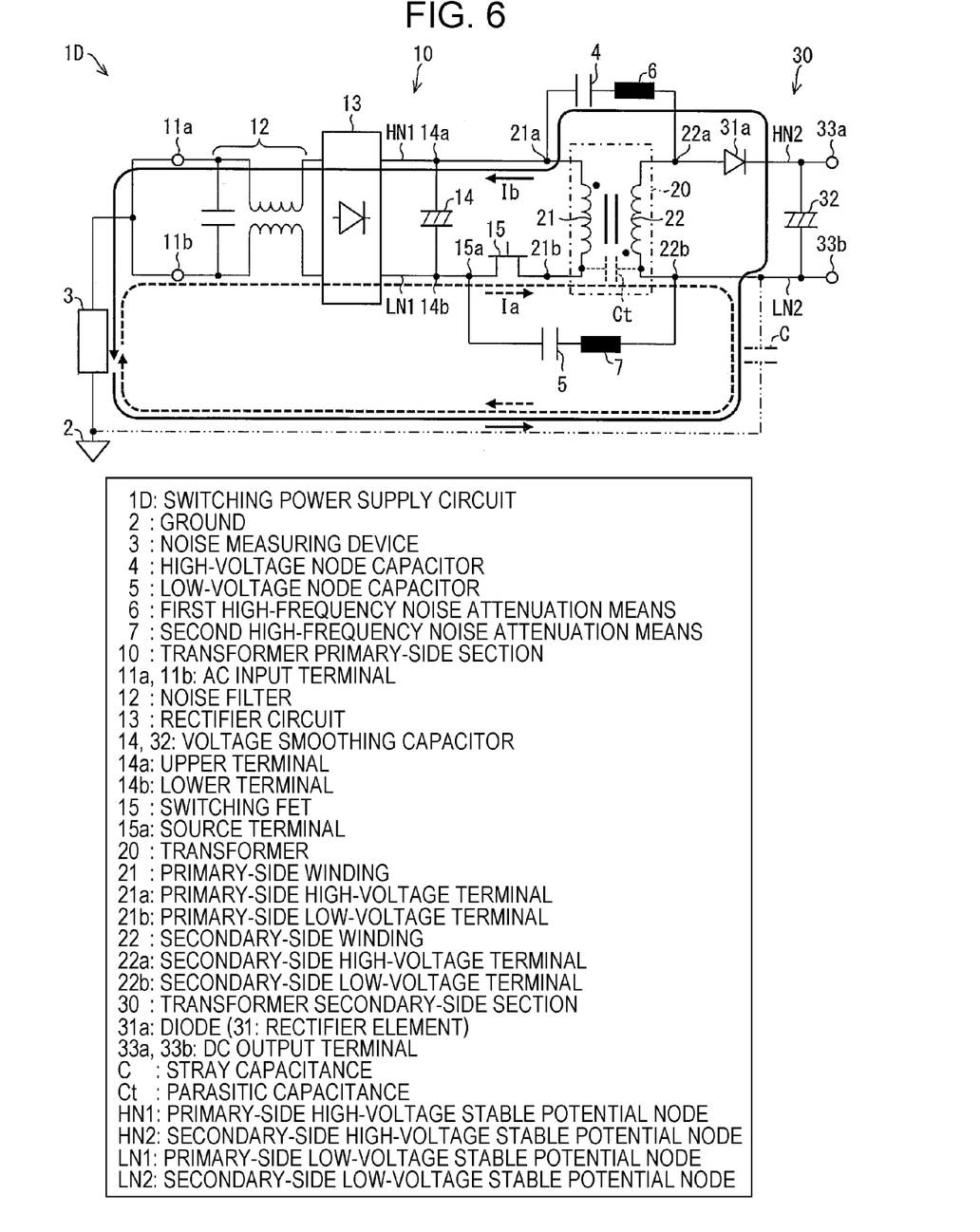
FIG. 6 is a circuit diagram illustrating a configuration of a switching power supply circuit in Embodiment 4 of the invention.

In the switching power supply circuit 1D of the present embodiment, as illustrated in FIG. 6, the first high-frequency noise attenuation means 6 is connected to the high-voltage node capacitor 4 in series, and the second high-frequency noise attenuation means 7 is connected to the low-voltage node capacitor 5 in series.

As a specific example of the first high-frequency noise attenuation means 6 and the second high-frequency noise attenuation means 7, a resistance, a ferrite bead, an inductor, or a combinational circuit of a plurality of them is able to be used, for example.

Even in a case where the capacitance value of the high-voltage node capacitor 4 is set so that common mode noise is reduced in the switching frequency band, impedances of a transmission path of the switching power supply circuit 1D and the stray capacitance C with respect to the ground 2 have frequency characteristics. Therefore, in a frequency other than the switching frequency, an offset effect of common mode noise is weakened, and there may be a possibility that high-frequency noise via the high-voltage node capacitor 4 or the low-voltage node capacitor 5 is increased.

According to a standard frequency band of noise, a fractional bandwidth occupied by a frequency band which is higher than the switching frequency is wide, and it is feared particularly that noise is increased in the frequency band which is higher than the switching frequency.

In the present embodiment, the first high-frequency noise attenuation means 6 is connected to the high-voltage node capacitor 4 in series, and the second high-frequency noise attenuation means 7 is connected to the low-voltage node capacitor 5 in series. Therefore, it is also possible to suppress noise particularly in the frequency band which is higher than the switching frequency.

Note that, only either or both of the first high-frequency noise attenuation means 6 and the second high-frequency noise attenuation means 7 may be provided.

In this manner, in the switching power supply circuit 1D of the present embodiment, the first high-frequency noise attenuation means 6 is connected to the high-voltage node capacitor 4 in series.

Thereby, in addition to the offset effect of common mode noise in the switching frequency by the high-voltage node capacitor 4, it is possible to add an offset effect of common mode noise in a frequency other than the switching frequency by the first high-frequency noise attenuation means 6.

Accordingly, it is also possible to suppress common mode noise in a frequency band which is higher than the switching frequency, for example.

In addition, in the switching power supply circuit 1D of the present embodiment, the second high-frequency noise attenuation means 7 is connected to the low-voltage node capacitor 5 in series.

Thereby, in addition to suppression of potential fluctuation of the stable potential nodes by the low-voltage node capacitor 5, it is possible to add an attenuation effect of common mode noise in a frequency other than the switching frequency by the second high-frequency noise attenuation means 7.

Accordingly, it is also possible to suppress common mode noise in a frequency band which is higher than the switching frequency, for example.

Note that, the invention is not limited to the aforementioned embodiments, and various modifications can be made within the scope of claims of the invention. For example, in the aforementioned embodiment, the first high-frequency noise attenuation means 6 or the second high-frequency noise attenuation means 7 is connected in series to at least one of the high-voltage node capacitor 4 and the low-voltage node capacitor 5 in the switching power supply circuit 1A described in Embodiment 1.

However, there is no limitation thereto, and, for example, it is also possible to connect, in series, the first high-frequency noise attenuation means 6 or the second high-frequency noise attenuation means 7 to at least one of the high-voltage node capacitor 4 and the low-voltage node capacitor 5 in the switching power supply circuit 1B described in Embodiment 2.

Embodiment 5

Yet another embodiment of the invention is described based on FIG. 7 as follows. Note that, configurations other than what is described in the present embodiment are the same as those of Embodiment 1 to Embodiment 4 above. For convenience of description, the same reference signs are assigned to members having the same functions as those of members of Embodiment 1 to Embodiment 4 above, which are illustrated in the figure, and description thereof will be omitted.

Figure 7:
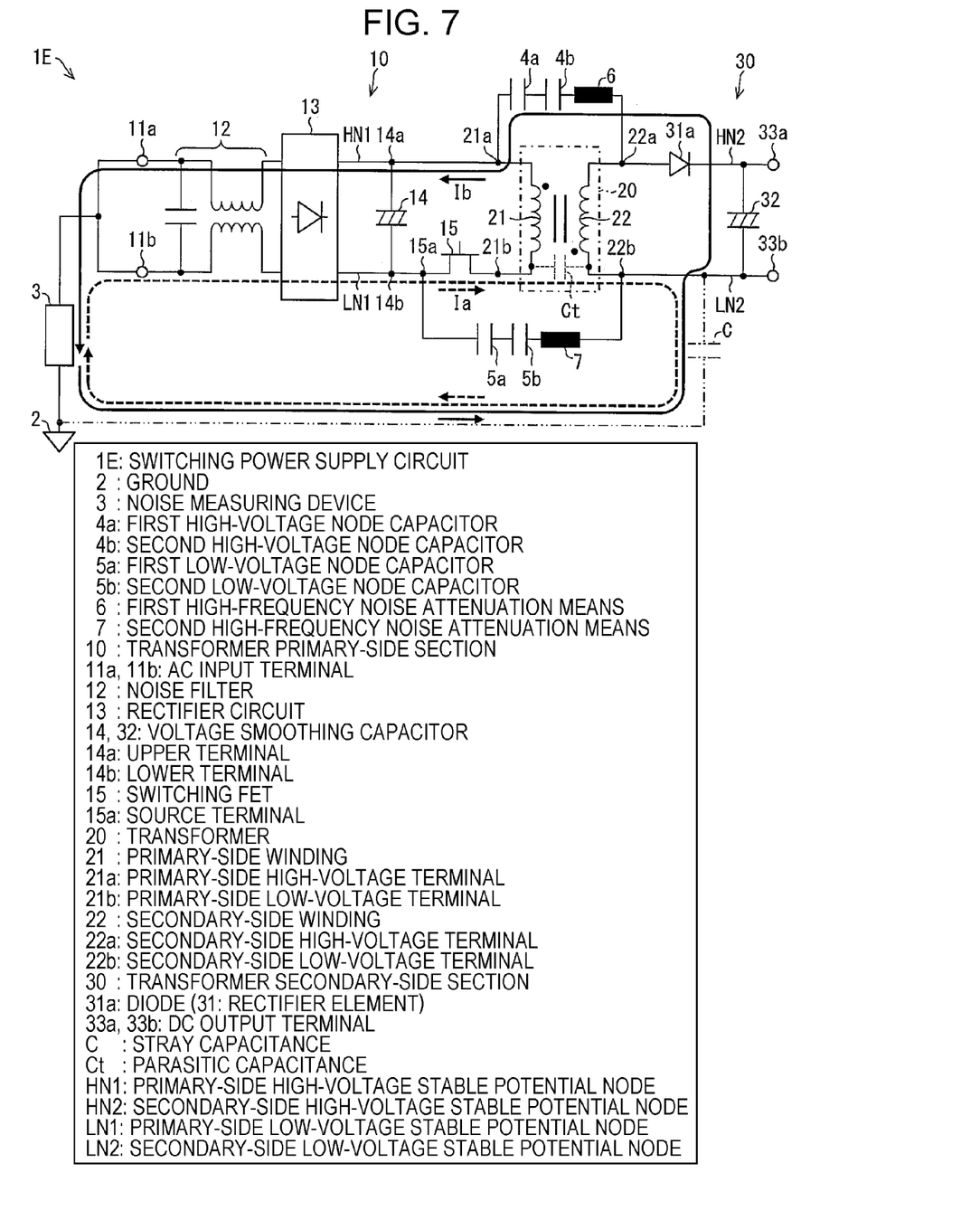
FIG. 7 is a circuit diagram illustrating a configuration of a switching power supply circuit in Embodiment 5 of the invention.

As illustrated in FIG. 7A, a switching power supply circuit 1E of the present embodiment 5 is different in that the switching power supply circuit 1E is obtained by combining the switching power supply circuit 1C of Embodiment 3 and the switching power supply circuit 1D of Embodiment 4.

A configuration of the switching power supply circuit 1E of the present embodiment will be described based on FIG. 7. FIG. 7 is a circuit diagram illustrating the configuration of the switching power supply circuit 1E of the present embodiment.

In the switching power supply circuit 1E of the present embodiment, as illustrated in FIG. 7, the first high-voltage node capacitor 4a, the second high-voltage node capacitor 4b, and the first high-frequency noise attenuation means 6 are connected in series. Moreover, the first low-voltage node capacitor 5a, the second low-voltage node capacitor 5b, and the second high-frequency noise attenuation means 7 are connected in series.

Note that, only the first high-voltage node capacitor 4a, the second high-voltage node capacitor 4b, and the first high-frequency noise attenuation means 6 may be connected in series, or only the first low-voltage node capacitor 5a, the second low-voltage node capacitor 5b, and the second high-frequency noise attenuation means 7 may be connected in series.

Further, also in the present embodiment, it is possible to use the MOSFET 31b serving as the rectifier element 31 in the switching power supply circuit 1B described in Embodiment 2.

SUMMARY

A switching power supply circuit 1A or 1B in an aspect 1 of the invention is a switching power supply circuit, including: a transformer 20 in which a primary side and a secondary side are insulated and separated and power is transmitted to the secondary side; a switching field effect transistor (switching FET 15) which performs switching of power in the primary side of the transformer 20; and a rectifier element 31 (diode 31a or MOSFET 31b) which rectifies power in the secondary side of the transformer 20, in which one end of a primary-side terminal of the transformer 20 (primary-side high-voltage terminal 21a) is connected to a primary-side high-voltage stable potential node HN1, the other end of the primary-side terminal of the transformer 20 (primary-side low-voltage terminal 21b) is connected to a drain of the switching field effect transistor (switching FET 15), a source of the switching field effect transistor (switching FET 15) is connected to a primary-side low-voltage stable potential node LN1, one end of a secondary-side terminal of the transformer 20 (secondary-side high-voltage terminal 22a) is connected to an anode of the rectifier element 31 (diode 31a or MOSFET 31b), a cathode of the rectifier element 31 (diode 31a or MOSFET 31b) is connected to a secondary-side high-voltage stable potential node HN2, the other end of the secondary-side terminal of the transformer 20 (secondary-side low-voltage terminal 22b) is connected to a secondary-side low-voltage stable potential node LN2, a low-voltage node capacitor 5 is connected between the primary-side low-voltage stable potential node LN1 and the secondary-side low-voltage stable potential node LN2, and a high-voltage node capacitor 4 is connected between the primary-side high-voltage stable potential node HN1 and the anode of the rectifier element 31 (diode 31a or MOSFET 31b).

According to the aforementioned invention, the low-voltage node capacitor is connected between the primary-side low-voltage stable potential node and the secondary-side low-voltage stable potential node. Thereby, since the primary-side low-voltage stable potential node and the secondary-side low-voltage stable potential node are electrically coupled by the low-voltage node capacitor, potential fluctuation of the stable potential nodes is suppressed.

Moreover, in the invention, the high-voltage node capacitor is connected between the primary-side high-voltage stable potential node and the anode of the rectifier element. Thereby, a common mode noise current which flows via the high-voltage node capacitor is to have a phase opposite to that of a common mode noise current which flows via the low-voltage node capacitor and a parasitic capacitance of the transformer. As a result thereof, a common mode noise current which flows via a stray capacitance between the secondary-side low-voltage stable potential node and the ground is suppressed.

Furthermore, in the invention, since the low-voltage node capacitor and the high-voltage node capacitor are only added, a configuration thereof is simple.

Thus, it is possible to provide a switching power supply circuit which achieves, with a simple configuration, both of noise reduction and potential stabilization of stable potential nodes.

In a switching power supply circuit in an aspect 2 of the invention, it is preferable that, in the switching power supply circuit of the aspect 1, a capacitance value of the high-voltage node capacitor is equal to or more than 25 pF and equal to or less than 100 pF.

Thereby, it is possible to obtain an effect of noise reduction by which an inductance value of a common mode noise filter can be reduced by half. As a result thereof, with a simple configuration in which the capacitance value of the high-voltage node capacitor is changed, it is possible to miniaturize the common mode noise filter.

In a switching power supply circuit in an aspect 3 of the invention, it is preferable that, in the switching power supply circuit of the aspect 1 or 2, the capacitance value of the high-voltage node capacitor is equal to or more than 45 pF and equal to or less than 85 pF.

Thereby, it is possible to obtain an effect of noise reduction by which the inductance value of the common mode noise filter can be reduced to one quarter. As a result thereof, with a simple configuration in which the capacitance value of the high-voltage node capacitor is changed, it is possible to further miniaturize the common mode noise filter.

In a switching power supply circuit in an aspect 4 of the invention, it is preferable that, in the switching power supply circuit of the aspect 1, 2, or 3, a capacitance value of the low-voltage node capacitor is 5 times or more and 18 times or less of the capacitance value of the high-voltage node capacitor.

Thereby, it is possible to attain potential stabilization of stable potential nodes and to obtain an effect of noise reduction by which the inductance value of the common mode noise filter can be reduced by half. As a result thereof, it is possible to miniaturize the common mode noise filter.

In a switching power supply circuit in an aspect 5 of the invention, it is preferable that, in the switching power supply circuit of any one of the aspects 1 to 4, the capacitance value of the low-voltage node capacitor is 5.5 times or more and 10 times or less of the capacitance value of the high-voltage node capacitor.

Thereby, it is possible to attain potential stabilization of stable potential nodes and to obtain an effect of noise reduction by which the inductance value of the common mode noise filter can be reduced to one quarter. As a result thereof, it is possible to further miniaturize the common mode noise filter.

In a switching power supply circuit 1B in an aspect 6 of the invention, it is preferable that, in the switching power supply circuit of any one of the aspects 1 to 5, the rectifier element 31 is formed of a switching metal oxide semiconductor field effect transistor (MOSFET 31b) whose source serving as the anode is connected to the one end of the secondary-side terminal of the transformer 20 (secondary-side high-voltage terminal 22a) and whose drain serving as the cathode is connected to the secondary-side high-voltage stable potential node HN2.

Thereby, the switching metal oxide semiconductor field effect transistor is used as the rectifier element. The switching metal oxide semiconductor field effect transistor has an extremely low on-resistance. As a result of this, when the switching metal oxide semiconductor field effect transistor is used as the rectifier element, it is possible to efficiently rectify a large current with a slight voltage drop, so that loss in the switching power supply circuit is reduced.

Thus, it is possible to provide a switching power supply circuit which has an excellent efficiency compared with a case where a silicon diode is used as the rectifier element.

In each of switching power supply circuits 1A to 1E in an aspect 7 of the invention, it is preferable that, in the switching power supply circuit of any one of the aspects 1 to 6, an operation of a flyback converter is to be performed by the transformer 20, the switching field effect transistor (switching FET 15), and the rectifier element 31.

The flyback converter is suitable to be used for small power to medium power such as about 1 to 200 W. Moreover, in spite of the small number of parts, it is possible to obtain comparatively high conversion efficiency, so that the flyback converter is suitable to be applied to electronic equipment such as a personal computer or industrial equipment.

Thus, by adopting a flyback converter system, it is possible to provide a switching power supply circuit by which miniaturization and weight reduction are attained and which is advantageous also to cost reduction.

In a switching power supply circuit 1C in an aspect 8 of the invention, it is preferable that, in the switching power supply circuit of any one of the aspects 1 to 7, at least one of the high-voltage node capacitor 4 and the low-voltage node capacitor 5 is configured with a series connection circuit of a plurality of capacitors.

Since each of the high-voltage node capacitor and the low-voltage node capacitor is connected to the primary side and the secondary side of the transformer, it is necessary to secure a certain distance between connection points for safety.

Then, by configuring at least one of the high-voltage node capacitor and the low-voltage node capacitor with the series connection circuit of the plurality of capacitors, each distance between the connection points is made easy to be secured.

In a switching power supply circuit in an aspect 9 of the invention, it is preferable that, in the switching power supply circuit of any one of the aspects 1 to 8, a first high-frequency noise attenuation means is connected to the high-voltage node capacitor in series.

Thereby, in addition to an offset effect of common mode noise in a switching frequency by the high-voltage node capacitor, it is possible to add an offset effect of common mode noise in a frequency other than the switching frequency by the first high-frequency noise attenuation means.

Accordingly, it is also possible to suppress common mode noise in a frequency band which is higher than the switching frequency, for example.

In a switching power supply circuit in an aspect 10 of the invention, it is preferable that, in the switching power supply circuit of any one of the aspects 1 to 9, a second high-frequency noise attenuation means is connected to the low-voltage node capacitor in series.

Thereby, in addition to suppression of potential fluctuation of a stable potential node by the low-voltage node capacitor, it is possible to add an attenuation effect of common mode noise in a frequency other than the switching frequency by the second high-frequency noise attenuation means.

Accordingly, it is also possible to suppress common mode noise in a frequency band which is higher than the switching frequency, for example.

Note that, the invention is not limited to each of the embodiments described above, and may be modified in various manners within the scope of the claims and an embodiment achieved by appropriately combining technical means disclosed in each of different embodiments is also encompassed in the technical scope of the invention.

INDUSTRIAL APPLICABILITY

The invention is applicable to a switching power supply circuit including a transformer in which a primary side and a secondary side are insulated and separated and power is transmitted to the secondary side, a switching transistor which performs switching of power in the primary side of the transformer, and a rectifier element which rectifies power in the secondary side of the transformer.

REFERENCE SIGNS LIST 1A switching power supply circuit
1B switching power supply circuit
1C switching power supply circuit
1D switching power supply circuit
1E switching power supply circuit
2 ground
3 noise measuring device
4 high-voltage node capacitor
4a first high-voltage node capacitor
4b second high-voltage node capacitor
5 low-voltage node capacitor
5a first low-voltage node capacitor
5b second low-voltage node capacitor
6 first high-frequency noise attenuation means
7 second high-frequency noise attenuation means
10 transformer primary-side section
11a, 11b AC input terminal
12 noise filter (common mode noise filter)
13 rectifier circuit
14 voltage smoothing capacitor for a high-voltage node
14a upper terminal
14b lower terminal
20 transformer
21 primary-side winding
21a primary-side high-voltage terminal (one end of primary-side terminal of transformer)
21b primary-side low-voltage terminal (the other end of primary-side terminal of transformer)
22 secondary-side winding
22a secondary-side high-voltage terminal (one end of secondary-side terminal of transformer)
22b secondary-side low-voltage terminal (the other end of secondary-side terminal of transformer)
30 transformer secondary-side section
31 rectifier element
31a diode
31b MOSFET
32 voltage smoothing capacitor
33a, 33b DC output terminal
C stray capacitance
Ct parasitic capacitance
HN1 primary-side high-voltage stable potential node
HN2 secondary-side high-voltage stable potential node
Ia common mode noise current
Ib common mode noise current
LN1 primary-side low-voltage stable potential node
LN2 secondary-side low-voltage stable potential node
Qp quasi-peak detection noise value

The invention claimed is:

1. A switching power supply circuit, comprising: a transformer in which a primary side and a secondary side are insulated and separated and power is transmitted to the secondary side; a switching field effect transistor which performs switching of power in the primary side of the transformer; and a rectifier element which rectifies power in the secondary side of the transformer, wherein
one end of a primary-side terminal of the transformer is connected to a primary-side high-voltage stable potential node,
the other end of the primary-side terminal of the transformer is connected to a drain of the switching field effect transistor,
a source of the switching field effect transistor is connected to a primary-side low-voltage stable potential node,
one end of a secondary-side terminal of the transformer is connected to an anode of the rectifier element,
a cathode of the rectifier element is connected to a secondary-side high-voltage stable potential node,
the other end of the secondary-side terminal of the transformer is connected to a secondary-side low-voltage stable potential node,
a low-voltage node capacitor is connected between the primary-side low-voltage stable potential node and the secondary-side low-voltage stable potential node,
a high-voltage node capacitor is connected between the primary-side high-voltage stable potential node and the anode of the rectifier element,
a capacitance value of the low-voltage node capacitor is 5 times or more and 18 times or less of a capacitance value of the high-voltage node capacitor,
a noise filter is provided on the primary side, and
a capacitance value of the high-voltage node capacitor is equal to or more than 25 pF and equal to or less than 100 pF by which an inductance value of the noise filter is reduced by half.

2. The switching power supply circuit according to claim 1, wherein the rectifier element is formed of a switching metal oxide semiconductor field effect transistor whose source serving as the anode is connected to the one end of the secondary-side terminal of the transformer and whose drain serving as the cathode is connected to the secondary-side high-voltage stable potential node.

3. The switching power supply circuit according to claim 1, wherein at least one of the high-voltage node capacitor and the low-voltage node capacitor is configured with a series connection circuit of a plurality of capacitors.

4. The switching power supply circuit according to claim 1, wherein a first high-frequency noise attenuation means is connected to the high-voltage node capacitor in series.

* * * * *